(12) United States Patent
Seward, IV et al.

(10) Patent No.: US 10,396,910 B2
(45) Date of Patent: Aug. 27, 2019

(54) OVER THE AIR COMMANDS FOR RF TESTING

(71) Applicant: Silicon Laboratories, Inc., Austin, TX (US)

(72) Inventors: DeWitt Clinton Seward, IV, Arlington, MA (US); Clayton Hollis Daigle, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 119 days.

(21) Appl. No.: 15/334,681

(22) Filed: Oct. 26, 2016

(65) Prior Publication Data

US 2018/0115372 A1   Apr. 26, 2018

(51) Int. Cl.
| | | |
|---|---|---|
| H04B 17/16 | (2015.01) | |
| H04W 4/80 | (2018.01) | |
| H04B 17/15 | (2015.01) | |
| H04B 17/17 | (2015.01) | |

(52) U.S. Cl.
CPC ............ *H04B 17/16* (2015.01); *H04B 17/15* (2015.01); *H04W 4/80* (2018.02); *H04B 17/17* (2015.01)

(58) Field of Classification Search
CPC ................................ H04B 17/16; H04B 17/18
See application file for complete search history.

(56) References Cited

U.S. PATENT DOCUMENTS

| | | | | |
|---|---|---|---|---|
| 2004/0207422 A1* | 10/2004 | Lehtinen | ................ | H04B 17/16 455/423 |
| 2005/0282502 A1* | 12/2005 | Kursula | ................. | H04B 17/15 455/67.14 |
| 2011/0149759 A1* | 6/2011 | Jollota | ................. | A61B 5/0024 370/252 |
| 2014/0270211 A1* | 9/2014 | Solum | .................. | H04R 25/554 381/60 |
| 2014/0362711 A1* | 12/2014 | Jiang | ..................... | H04W 24/02 370/252 |
| 2015/0126132 A1* | 5/2015 | Chung | ................. | H04B 1/3827 455/67.14 |
| 2016/0056902 A1* | 2/2016 | Eremenko | ............... | H04M 1/24 455/67.11 |
| 2017/0061168 A1* | 3/2017 | Sundaram | ............ | G06K 7/0095 |
| 2017/0142067 A9* | 5/2017 | Pietrowicz | ............... | G01R 1/20 |
| 2017/0160124 A1* | 6/2017 | Drachmann | ........ | G01F 25/0007 |
| 2017/0289745 A1* | 10/2017 | Liu | ........................ | H04W 4/008 |

* cited by examiner

*Primary Examiner* — Hassan Kizou
*Assistant Examiner* — Deepa Belur
(74) *Attorney, Agent, or Firm* — Nields, Lemack & Frame, LLC

(57) ABSTRACT

A system and method of allowing a network device to enter RF test mode without changing the software image or attaching cables to it is disclosed. In one embodiment, the software image loaded into the network device has the capability to execute in both normal operating mode and RF test mode. A command is issued by a RF test tool which instructs the network device to enter one of one or more different RF modes. In certain embodiments, the network device remains in this RF test mode for a predetermined period of time. In other embodiments, the network device remains in this RF test mode until the power is cycled.

11 Claims, 4 Drawing Sheets

OVER THE AIR COMMANDS FOR RF TESTING

This disclosure describes systems and methods allowing a RF test tool to force a network device to enter an RF test mode.

BACKGROUND

The explosion of network connected devices has led to an increased use of certain protocols. For example, ZIGBEE® is now commonly used in many applications, including utility meters, lighting systems and the like.

One issue with ZIGBEE® and other low power network devices is the need for RF testing. Traditionally, these network devices are very low power, compact and low cost. Consequently, the software that is loaded on the network device is typically configured only for normal operating mode. Therefore, in order to perform RF testing, such as FCC testing, it may be necessary to replace the software on the network device with special test software that creates the necessary test patterns. Alternatively, it may be necessary to attach the network device, such as via a wired connection, to another device which invokes the various test patterns. However, the attachment of these wires is known to affect the results and validity of these RF tests and can often involve destructive access to the enclosed electronics damaging the RF shielding of the enclosure.

Further, because the software used for RF testing is different from the software used for normal operating mode, it is difficult to determine whether the normal operation of the network device affects the RF test results. For example, if the network device includes a light bulb, it is currently difficult to understand the effect that the operation of the light bulb has on RF testing and its results. For example, interference caused by the pulsing or emissions from a light bulb may affect the transmit power or receiver sensitivity of the network device. However, these effects are impossible to diagnose currently.

Finally, for certain classes of devices, the RF module of the device may be completely inaccessible to the outside world without destroying the enclosure, thereby invalidating any further testing, and making it practically impossible to add test firmware to the device. This is of particular importance in the case of field failure analysis where a device that is failing in the field is returned to the factory for diagnostic purposes.

Therefore, an improved system and method of allowing a network device to enter RF test mode without changing the software image is needed. Further, it would be beneficial if this system and method was simple to implement so as to be easily accomplished.

SUMMARY

A system and method of allowing a network device to enter RF test mode without changing the software image or attaching cables to the device is disclosed. In one embodiment, the software image loaded into the network device has the capability to execute in both normal operating mode and RF test mode. A command is issued by a RF test tool which instructs the network device to enter one of one or more different RF modes. In certain embodiments, the network device remains in this RF test mode for a predetermined period of time. In other embodiments, the network device remains in this RF test mode until the power is cycled.

In one embodiment, a method of testing the RF characteristics of a network device, where the network device comprises instructions allowing both normal operating mode and RF test mode is disclosed. The method comprises transmitting a command to the network device, the command invoking a RF mode test in the network device; performing an RF test after the network device enters the RF test mode; and returning the network device to normal operation after the completion of the RF test. In certain embodiments, the commands are transmitted using an IEEE802.15.4-based network protocol, such as ZIGBEE®.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
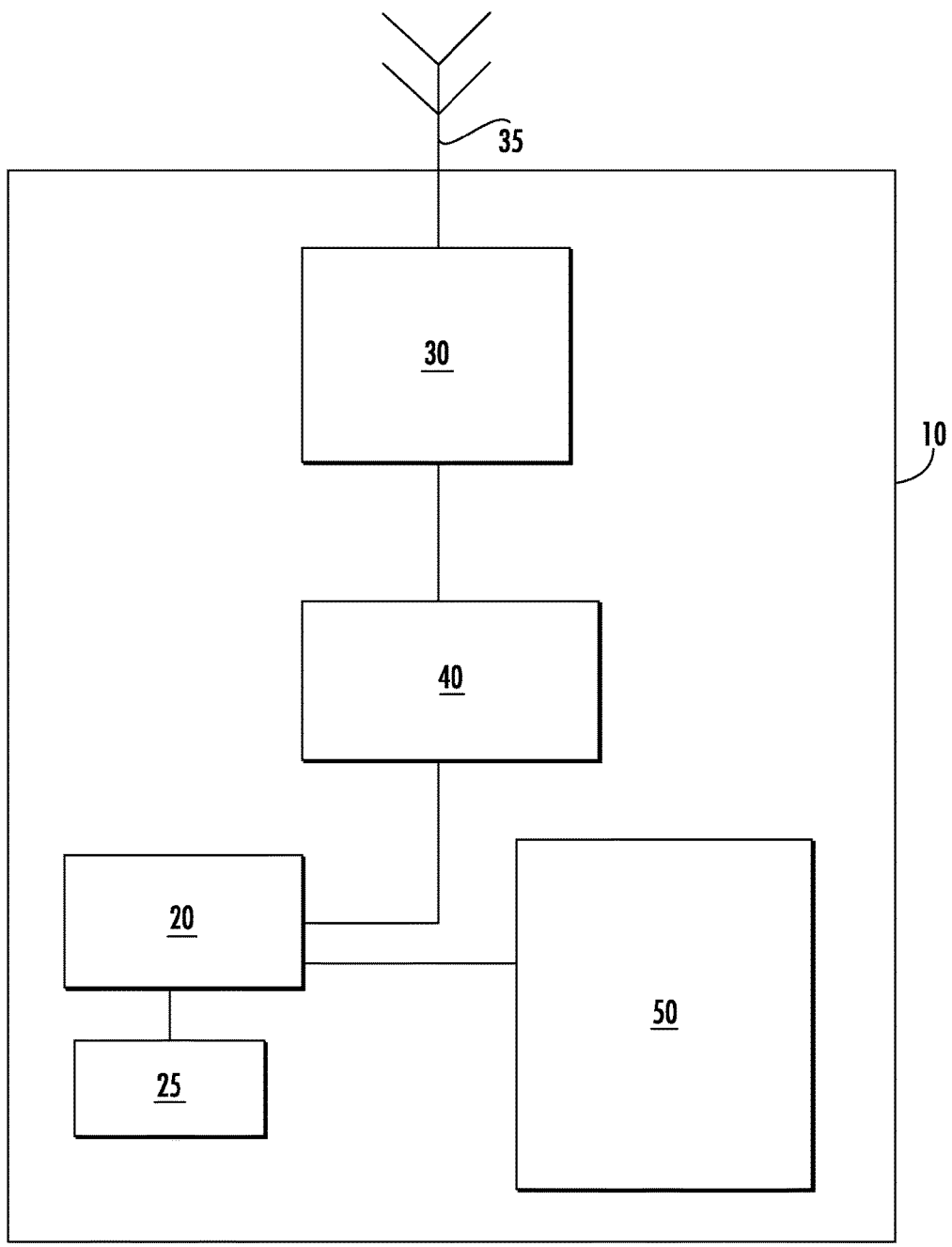
FIG. 1 is a block diagram of the RF test tool.

FIG. 1 shows a block diagram of a representative RF test tool 10. The RF test tool 10 has a processing unit 20 and an associated memory device 25. This memory device 25 contains the instructions, which, when executed by the processing unit 20, enable the RF test tool 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. In certain embodiments, the memory device 25 may be packaged with the processing unit 20. The processing unit 20 may be any suitable device, including but not limited to a general purpose processor, an application specific processor, an embedded controller, or a personal computer (PC).

The RF test tool 10 also includes a network interface 30, which may be a wireless interface including an antenna 35. The network interface 30 may support any wireless network, including IEEE802.15.4-based protocols, such as Thread, ZIGBEE® or the like. Other protocols such as BLUETOOTH®, or a cellular protocol, such as 3G, GCM, CDMA, 4G, or LTE, may be utilized as well. In other embodiments, the network interface 30 is a wired connection, such as USB. In these embodiments, the network interface 30 may not include an antenna 35.

The RF test tool 10 may include a second memory device 40 in which data that is received by the network interface 30, and data that is to be transmitted by the network interface 30, is stored. This second memory device 40 is traditionally a volatile memory. The processing unit 20 has the ability to read and write the second memory device 40 so as to communicate with the other nodes in the network. Although not shown, the RF test tool 10 also has a power supply, which may be a battery or a connection to a permanent power source, such as a wall outlet.

The RF test tool 10 may also include a display element 50. In some embodiments, the display element 50 may be a LED or LCD screen. In certain embodiments, the display element 50 is a touch screen so that input may be supplied to the processing unit 20 through the display element 50. In certain embodiments, a separate input device, such as a keyboard may be used.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and the programming language is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the RF test tool 10. The instructions contained on this second computer readable media may be downloaded onto the memory device 25 to allow execution of the instructions by the RF test tool 10.

Any device that includes the components enumerated above may be used as the RF test tool. In one specific embodiment, the RF test tool 10 may be a mobile telephone or tablet computer. In another embodiment, the RF test tool 10 is a device which utilizes the same network protocol as the network device to be tested. For example, the RF test tool 10 may be a gateway device, using an IEEE802.15.4 network protocol, such as ZIGBEE® or Thread. In some embodiments, this gateway may be a specially designed device, while in other embodiments, the gateway is a standard device, which also includes the instructions to perform the functions described herein. In certain embodiments, a standard gateway may be converted into the RF test tool 10 by downloading special software to the gateway.

In certain embodiments, the instructions described herein may be packaged as a software application. The RF test tool 10 may receive the software application from a remote server. For example, in one embodiment, a software application may be made available on a remote server, such as a corporate server. In certain embodiments, the software application may be available on a digital distribution platform, such as Google Play, Microsoft Store, the Apple App Store and others. In other embodiments, the instructions may be pre-loaded in the RF test tool 10.

Figure 2:
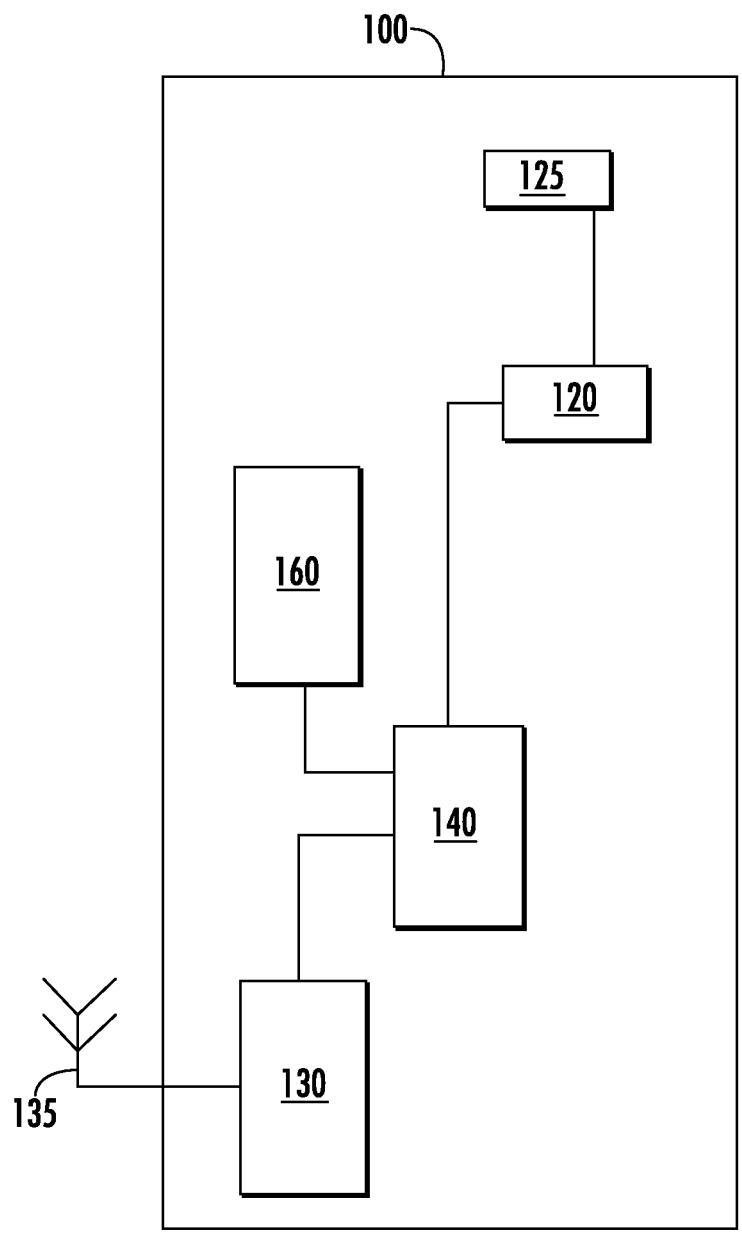
FIG. 2 shows a network device according to one embodiment.

FIG. 2 shows the network device to be configured according to one embodiment. The network device 100 has a processing unit 120 and an associated memory device 125. This memory device 125 contains the instructions, which, when executed by the processing unit 120, enable the network device 100 to perform the functions described herein. This memory device 125 may be a non-volatile memory, such as a FLASH ROM, an electrically erasable ROM or other suitable devices. In other embodiments, the memory device 125 may be a volatile memory, such as a RAM or DRAM. In certain embodiments, the memory device 125 may be packaged with the processing unit 120. The processing unit 120 may be any suitable device, including but not limited to a general purpose processor, an application specific processor, an embedded controller, or a personal computer (PC). The memory device 125 contains the software image that the processing unit 120 executes to perform in both normal operating mode and in RF test mode. In other words, a single software image contains the instructions required for both modes of operation.

The network device 100 also includes a first network interface 130, which is typically a wireless interface including an antenna 135. The first network interface 130 may support an IEEE802.15.4 protocol, such as Thread, ZIGBEE® or the like. The network device 100 may also include a second network interface 160. This second network interface 160 supports a network protocol different from the first network interface 130. The second network interface 160 may support any wireless network, including BLUETOOTH® or a cellular protocol, such as 3G, GCM, CDMA, 4G, LTE, or other protocols. In other embodiments, the second network interface 160 may be a wired network, such as USB. In certain embodiments, the network device 100 is able to communicate on both network interfaces. In other embodiments, the network device 100 may not include a second network interface.

The network device 100 may include a second memory device 140 in which data that is received by the first network interface 130 and by the optional second network interface 160, and data that is to be transmitted by the network interfaces is stored. This second memory device 140 is traditionally a volatile memory. The processing unit 120 has the ability to read and write the second memory device 140 so as to communicate with the other nodes in the network. Although not shown, the network device 100 also has a power supply, which may be a battery or a connection to a permanent power source, such as a wall outlet.

Figure 3:
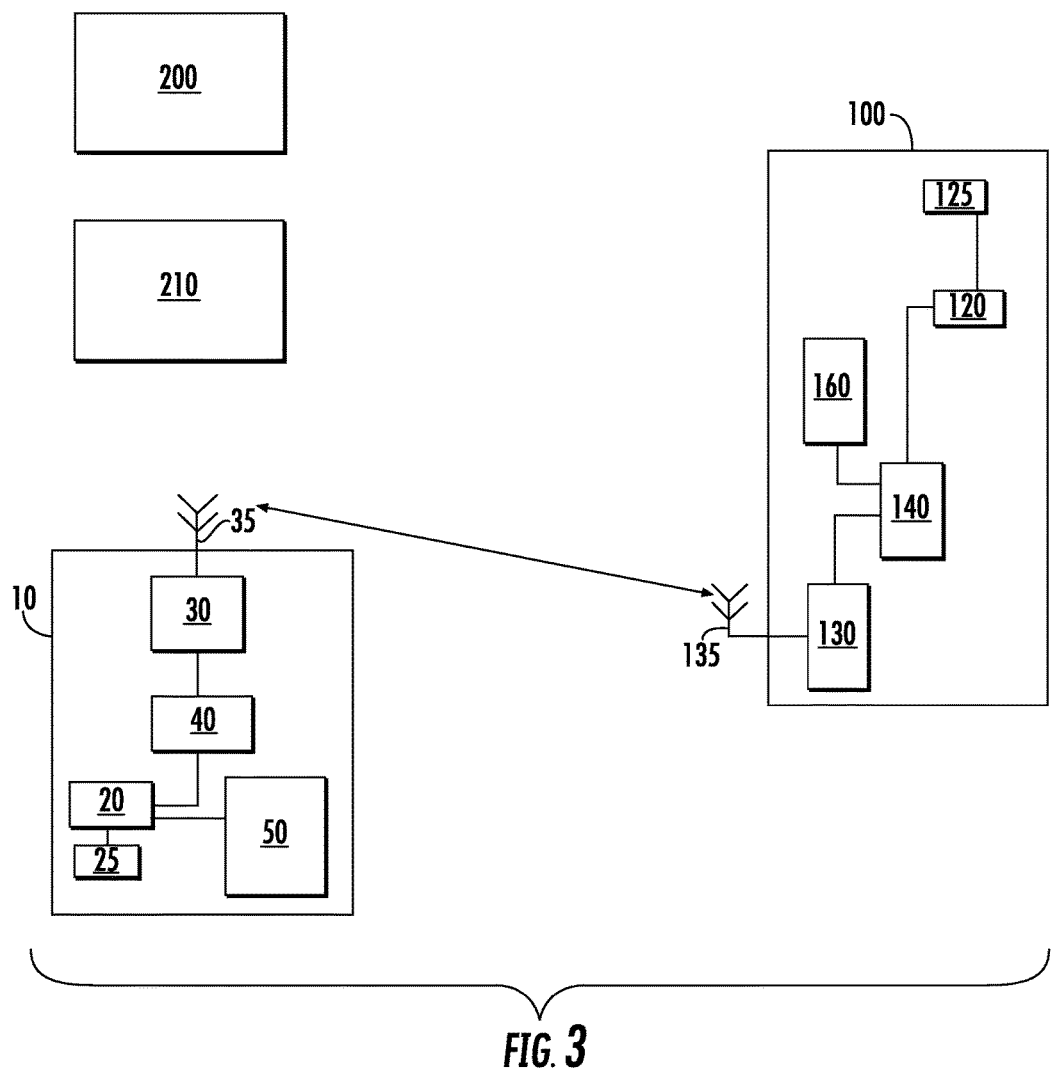
FIG. 3 shows a configuration of the system during RF testing according to one embodiment.

FIG. 3 shows the configuration of the system during RF testing according to a first embodiment. In this embodiment, the network interface 30 of the RF test tool 10 is able to communicate wirelessly with the first network interface 130 of the network device 100. In a variation of this embodiment, the network interface 30 of the RF test tool 10 is able to communicate wirelessly with the second network interface 160 of the network device 100. The choice of network protocol used during the RF testing is not limited by this disclosure, and may include Thread, ZIGBEE®, WIFI®, BLUETOOTH® or any other suitable protocol. In one particular embodiment, the RF test tool 10 communicates wirelessly with the network device 100 using the same network protocol as is used by the network device in normal operating mode.

The performance of RF testing may also require the use of RF test equipment 200. This RF test equipment 200 may be able to measure the transmit characteristics of the network device 100. These characteristics may include but are not limited to transmit power, transmit frequency, and signal integrity tests, such as error vector magnitude (EVM) tests. The configuration may also include a network packet generator 210. The network packet generator 210 is used to create network packets, and is used to test the receive capabilities of the network device 100. The network device 100 under test may use internal RF measurements to verify the quality of the receive mode of the device. This information may be stored non-volatility so that it may be read by the RF test tool after it resumes normal network activity.

Figure 4:
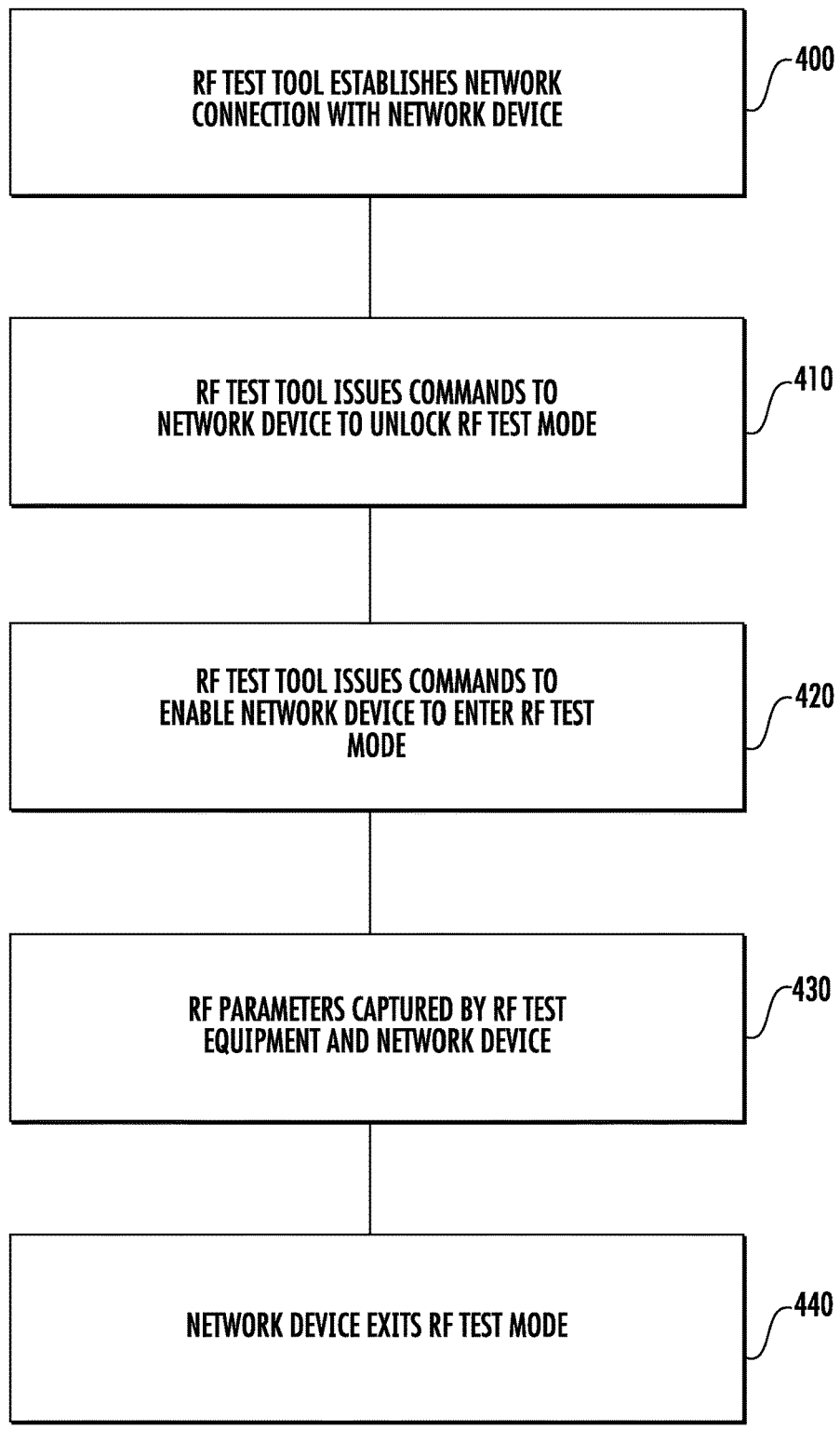
FIG. 4 shows a representative flowchart showing the operation of the RF test tool.

Having described the physical configuration of these components, the method of using the RF test tool 10 to test the network device 100 will be described. FIG. 4 shows a representative flowchart showing this method.

The RF test tool 10 is used to communicate with the network device 100 over the network connection. As described above, this may be a wireless connection, using the same network protocol that the network device typically uses. In this embodiment, the network connection may be made via the first network interface 130 of the network device 100, as shown in Process 400. In other embodiments, this may be a different network protocol. In these embodiments, the network connection may be made via the second network interface 160 of the network device 100. As described above, this may be a wireless connection, such as BLUETOOTH® and WIFI, or a wired connection, such as USB. It is important to note that the network device 100 may be fully assembled at this time. In fact, the network device 100 may be fully functional and ready for operation at this time.

Once the network connection has been established, the RF test tool 10 may issue commands to the network device 100 to invoke various RF test functions. In certain embodiments, there may be multiple vendor unique commands that are created to enable this functionality.

Of course, if vendor unique commands are used, the software image that is downloaded in the network device 100 must be able to interpret and execute these commands as well. In other words, the RF test tool 10 and the network device 100 both implement the same set of vendor unique commands in order to perform the RF testing.

In certain embodiments, the RF test tool 10 may begin by issuing a special unlock sequence, which enables the RF test modes within the network device 100, as shown in Process 410. In other words, while the RF test mode functionality is included in the software image, it cannot be accessed unless a special unlock sequence is received. This special unlock sequence may include a global or device-specific password that unlocks this RF test mode. This serves to insure that the RF test mode is not accidentally initiated. In other embodiments, an unlock sequence is not used.

The RF test tool 10 may then issue vendor unique commands to the network device 100, as shown in Process 420. These commands may instruct the network device 100 to enter a specific RF test mode for a specific period of time. Alternatively, these commands may instruct the network device 100 to enter a specific RF test mode until the power on the network device is cycled.

A first set of commands may be used to invoke one of a plurality of RF transmission tests. These RF transmission tests may include continuous transmission of packets, modulated stream of characters, or unmodulated carrier tone. For RF transmission tests, the RF test tool 10 may issue a vendor unique command, informing the network device 100 of the particular channel and transmit power to use. In certain embodiments, the vendor unique commands for RF transmissions include all of the following parameters: transmit channel, transmit power, RF transmission test mode, and test duration. In other embodiments, these parameters are passed to the network device 100 in two or more vendor unique commands.

Once the network device 100 has entered one of these RF transmission test modes, its outputs may be captured by the RF test equipment 200, which measures the transmit characteristics of the network device 100, as shown in Process 430.

The RF transmission tests may also be used in conjunction with other functions. For example, in certain embodiments, the network device 100 may have an attached light bulb. This light bulb may be operated at a plurality of power levels, and optionally with different colors. Changes to the light bulb may affect the RF transmission tests. Thus, in certain modes, the RF test tool 10 may instruct the network device 100 to configure the light bulb in a certain state (i.e. brightness, color, etc). This may be done in normal operating mode. In other embodiments, this may be done using a vendor unique condition in RF test mode. After the light bulb has been configured, the RF transmission test may be conducted. This allows the designer to understand any interactions that may exist between the other functions of the network device 100 and the RF transmission characteristics. While the above describes a network device with a light bulb, this combination of functional and RF transmission testing can be used for any other functions that the network device supports.

A second set of commands may be used to invoke one of a plurality of RF receive tests. The receive tests may be used to perform receiver sensitivity tests. In this case, the RF test tool 10 may send a vendor unique command to the network device 100, which includes the channel on which to listen, as well as the time period during which the network device should count incoming packets. During this time period, the network device 100 may also collect statistics, such as receive signal strength, link quality indication, and others, as shown in Process 430. Thus, the vendor unique command may instruct the network device regarding: the receive channel, the time duration for the receiver test, whether to collect statistics and which statistics to collect. After the vendor unique command has been issued by the RF test tool 10, the network packet generator 210 may be enabled, to transmit packets to the network device 100.

After the RF receiver tests are completed, the statistics collected by the network device 100 may be stored in non-volatile memory, so as to survive a power cycle, and may be read by the RF test tool 10. In certain embodiments, this may be done using a vendor unique command.

If desired, functional and RF receiver tests may be combined as well. For example, using the example cited above, the RF test tool 10 may instruct the network device to operate the light bulb at a specific power level and color and then conduct the RF receiver tests.

In the embodiment where the RF mode is invoked for a specific period of time, the network device 100 is able to operate in normal operating mode immediately after the RF test is completed, as shown in Process 440. In the embodiment where the RF mode is invoked indefinitely, the network device 100 is able to operate in normal operating mode following a power cycle. Note that in either mode, there is no need to change the software loaded in the network device 100, or to physically connect any cables to the network device 100 to execute these RF tests. Note that in both cases, there is no need to download new software to the network device. Rather, as described above, the software image stored in the network device is able to operate in both RF test mode and normal operating mode without modification.

In one specific embodiment, the RF test tool 10 comprises a display element 50. The display element 50 may indicate to a user a menu of possible RF tests that may be performed. The user may select one of these RF test from this menu. For example, the display element 50 may be a touchscreen, so that the user simply taps the display element 50 to indicate a choice. In other embodiments, the RF test tool 10 may have a separate input device (not shown) through which the user enters the selections. In certain embodiments, the display element 50 may also allow the user to select other parameters, such as the channel to use, the transmit power, and other parameters. The display element 50 may also allow the user to select a duration of time that the RF test mode is to be invoked. Once the user makes the required selections, the RF test tool 10 then transmits the commands which correspond to the user's choices to the network device 100.

As described above, this disclosure allows for the RF testing of a network device without making any modifications to the device. Specifically, the hardware configuration is not altered, and the software image is not changed. Thus, RF testing performed in this manner provide the most accurate representation of the actual RF characteristics of the device.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for testing RF characteristics of a fully assembled and fully functional wireless network device comprising:
   a RF test tool, comprising:
      a network interface,
      a processing unit, and
      a memory device; and
   a wireless network device, configured to operate on a ZIGBEE network, comprising:
      a network interface,
      a processing unit, and
      a memory device, wherein the memory device comprises instructions which allow the wireless network device to operate in both a normal operating mode and in a RF test mode; and
   wherein the RF test tool transmits commands using the network interface to the wireless network device which cause the wireless network device to enter the RF test mode indefinitely, and the wireless network device returns to normal operating mode after power is cycled, wherein the RF test tool and the wireless network device utilize ZIGBEE protocol to communicate, and
   wherein during a RF transmission test, the wireless network device transmits a continuous transmission of packets, a modulated stream of characters or an unmodulated carrier tone; and
   RF test equipment is used to measure transmission characteristics of the wireless network device during the RF transmission test, wherein the RF test equipment measures transmit power, transmit frequency, or signal integrity tests, such as error vector magnitude (EVM) tests; and
      wherein during a RF receive test, a RF packet generator is used to create network packets and the wireless network device measures receive characteristics of the network device based on network packets generated by the packet generator and collects statistics in the network device during the receive test, which are extracted after power is cycled to the wireless network device.

2. The system of claim 1, wherein the commands are vendor unique commands.

3. The system of claim 1, wherein the RF test tool transmits an unlock sequence to the wireless network device to unlock the RF test mode.

4. The system of claim 1, wherein the statistics collected by the wireless network device are stored in nonvolatile memory so as to survive the power cycle.

5. A method of testing RF characteristics of a wireless network device, where the wireless network device is fully assembled, fully functional and comprises instructions allowing both normal operating mode and RF test mode, comprising:
   transmitting a command to the network device using ZIGBEE protocol, the command invoking a RF test mode in the network device, wherein the command specifies that the network device is to remain in the RF test mode indefinitely, and the network device returns to normal operating mode after power is cycled;
   performing an RF test after the network device enters the RF test mode, wherein the RF test is a RF transmission test or a RF receive test;
   wherein, in the case of a RF transmission test, the RF transmission test is selected from the group consisting of continuous transmission of packets, modulated stream of characters and unmodulated carrier tone; and the method further comprises:
   using RF test equipment to measure transmission characteristics of the network device during the RF transmission test, wherein the RF test equipment measures transmit power, transmit frequency, or signal integrity tests, such as error vector magnitude (EVM) tests; and
   wherein, in the case of a RF receive test, the method further comprises:
      performing an RF receive test after the network device enters the RF test mode by actuating a RF packet generator to create network packets;
      collecting statistics in the network device during the receive test; and
   extracting the statistics from the network device after power has been cycled to the network device.

6. The method of claim 5, wherein, in the case of a RF receive test, the command includes a channel on which the network device is to listen.

7. The method of claim 5, wherein, in the case of a RF transmission test, the command includes a channel on which the network device is to transmit and a transmit power to use.

8. The method of claim 5, wherein the network device comprises a light, the method further comprising selecting a power level or color for the light prior to performing the RF transmission test.

9. The method of claim 5, where a special unlock sequence is transmitted to the network device to allow the network device to enter the RF test mode.

10. The method of claim 5, wherein the network device comprises a light, the method further comprising selecting a power level or color for the light prior to performing the RF receive test.

11. The method of claim 5, wherein the statistics collected by the wireless network device are stored in nonvolatile memory so as to survive the power cycle.

* * * * *